United States Patent [19]

Petersen

[11] Patent Number: 4,756,260
[45] Date of Patent: Jul. 12, 1988

[54] SUB-SURFACE SLUDGE INJECTOR APPARATUS

[76] Inventor: John E. Petersen, 6 U.S. Hwy. 27 North, Lake Wales, Fla. 33853

[21] Appl. No.: 848,701

[22] Filed: Apr. 4, 1986

[51] Int. Cl.⁴ .............................................. A01C 3/06
[52] U.S. Cl. ...................................... 111/7; 172/23; 239/736
[58] Field of Search ................ 111/6, 7; 172/23, 438; 405/128, 129, 269; 239/736–738, 745; 137/355.12, 355.16, 355.17, 355.19

[56] References Cited

U.S. PATENT DOCUMENTS

| | | | |
|---|---|---|---|
| 2,194,460 | 3/1940 | Heimann | 446/378 |
| 3,150,830 | 9/1964 | Griffith | 137/355.16 |
| 3,277,601 | 10/1966 | Ryan | 446/378 |
| 3,613,803 | 10/1971 | Payne | 172/23 |
| 3,793,967 | 2/1974 | van den Berg | 111/7 |
| 3,842,764 | 10/1974 | Bauer | 111/7 |
| 3,865,056 | 2/1975 | Danford | 111/7 |
| 3,865,057 | 2/1975 | Frazier | 111/7 |
| 3,912,694 | 10/1975 | Chiappe et al. | 446/354 X |
| 3,945,332 | 3/1976 | Wirsbinski | 111/7 |
| 4,014,271 | 3/1977 | Rohlf | 111/7 |
| 4,034,686 | 7/1977 | Collins | 111/7 |
| 4,069,029 | 1/1978 | Hudson | 62/51 |
| 4,074,639 | 2/1978 | Hodgson | 111/6 |
| 4,116,138 | 9/1978 | McFarland et al. | 111/7 |
| 4,174,809 | 11/1979 | Arlemark | 239/745 |
| 4,186,881 | 2/1980 | Long | 239/198 |
| 4,232,616 | 11/1980 | van der Lely | 111/7 |
| 4,232,826 | 11/1980 | Broughton | 137/355.19 |
| 4,448,690 | 5/1984 | Maphis | 111/7 |

OTHER PUBLICATIONS

Hudig International, Inc. Undated Irromat Brochure.

*Primary Examiner*—James R. Feyrer

[57] ABSTRACT

The combination of a self-powered reel dolly and a traveling plow injector carriage joined together by a traveling hard hose supply line is disclosed. The plow injector carriage carries a multiple shank plow and a plurality of injector pipes which, when the plow blades are engaged in the ground, provide sub-surface injection of liquified sludge or other waste materials which is supplied to the carriage through the hard hose supply line. As the reel dolly winds in the supply line, the latter correspondingly pulls in or returns the plow injector carriage from an initial downfield position to a final "home" position adjacent the reel dolly. In addition to underground dispersion of the effluent through the injector pipes, an additional above-ground water gun and/or spreader manifold can be used as desired.

9 Claims, 3 Drawing Sheets

SUB-SURFACE SLUDGE INJECTOR APPARATUS

FIELD OF THE INVENTION

This invention relates to subsoil waste effluent injection devices, and more particularly to a combination self-powered reel dolly, traveling supply line, and plow injector carriage for injecting liquified sludge below the ground.

BACKGROUND OF THE INVENTION

Numerous prior methods of dispersing liquified waste effluent, sludge, and other similar materials have been utilized for agricultural, fertilization, and similar purposes. For example, so-called "hard hose travelers" having above-ground water nozzles have been used; see U.S. Pat. No. 4,186,881 which typifies such an above-ground spray-type hard hose traveler. However, the above-ground spraying of effluent oftentimes is undesirable due to wind conditions, the potential plugging of spray lines and nozzles, and the fact that the sprayed effluent often partially evaporates prior to soil penetration. Additionally, there have been sludge injectors carried by motorized units, such as trucks or tractors which drive through a field pulling an underground injector; see U.S. Pat. Nos. 4,014,271 and 4,069,029 which typify such devices. However, such motorized units are considered unsatisfactory due to their heavy weight which undesirably compacts the soil's surface, and because they are relatively expensive and require continuous manual operation.

SUMMARY OF THE INVENTION

The present invention overcomes the foregoing problems of the above-noted and other prior art devices by providing the combination of a self-powered reel dolly, a traveling hard hose supply line controlled, i.e., operable to be reeled in by the reel dolly, and used to supply liquified effluent materials, and a plow injector carriage connected to the supply line, for providing sub-surface injection of liquified waste materials. This combination, once set up at a desired field location, is operator free. A small engine mounted on the stationary reel dolly drives, through an appropriate gear reduction and chain-drive system, the large wind-up reel which winds in the traveling hard hose supply line. At its other end, this hose is connected to the plow injector carriage.

Thus, after the supply line and carriage are first extended to a desired downfield position, the powered reeling in of the supply line, and hence of the attached carriage, causes the carriage's plow shares and injector pipes to disperse the liquified effluent beneath the field's surface within plowed furrows. Additional waste dispersion means can be added if desired to selectively provide aboveground dispersion of the effluent. Moreover, additional wiper means can be used to replace the disturbed soil over the plowed furrows once sludge injection has occurred.

It is therefore an object of the present invention to provide a relatively inexpensive, operator-free, powerized apparatus which can provide sub-surface injection of liquified sludge or other effluent.

It is a further object of the present invention to provide a plow injector carriage for sub-surface injection of liquid wastes which can be pulled along the ground in a stabilized manner and which has spring-biased plow blades and sludge injector pipes.

The means by which the foregoing and other objects of the present invention are accomplished and the manner of their accomplishment will be readily understood from the following specification upon reference to the accompanying drawings, in which.

Figure 3:
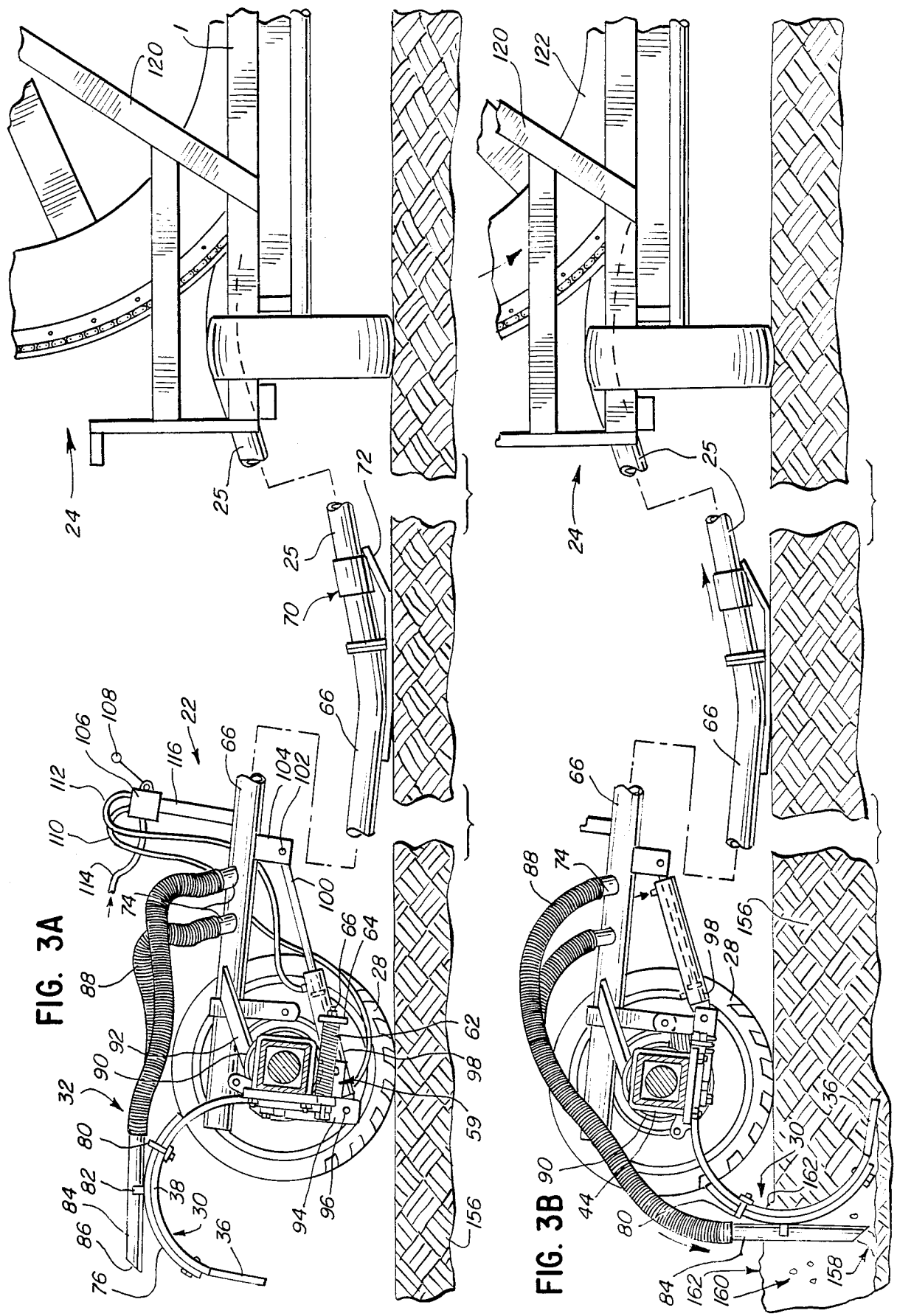
Figure 4:
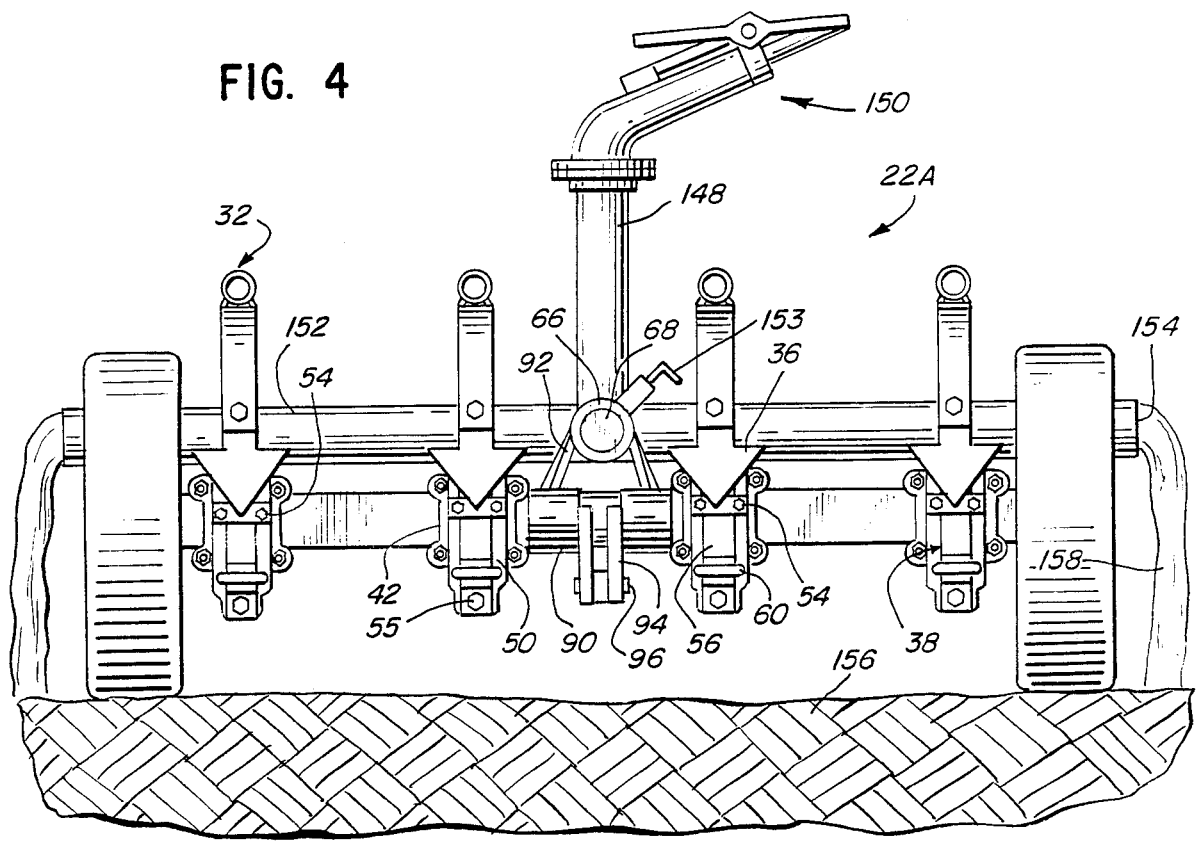
Figure 5:
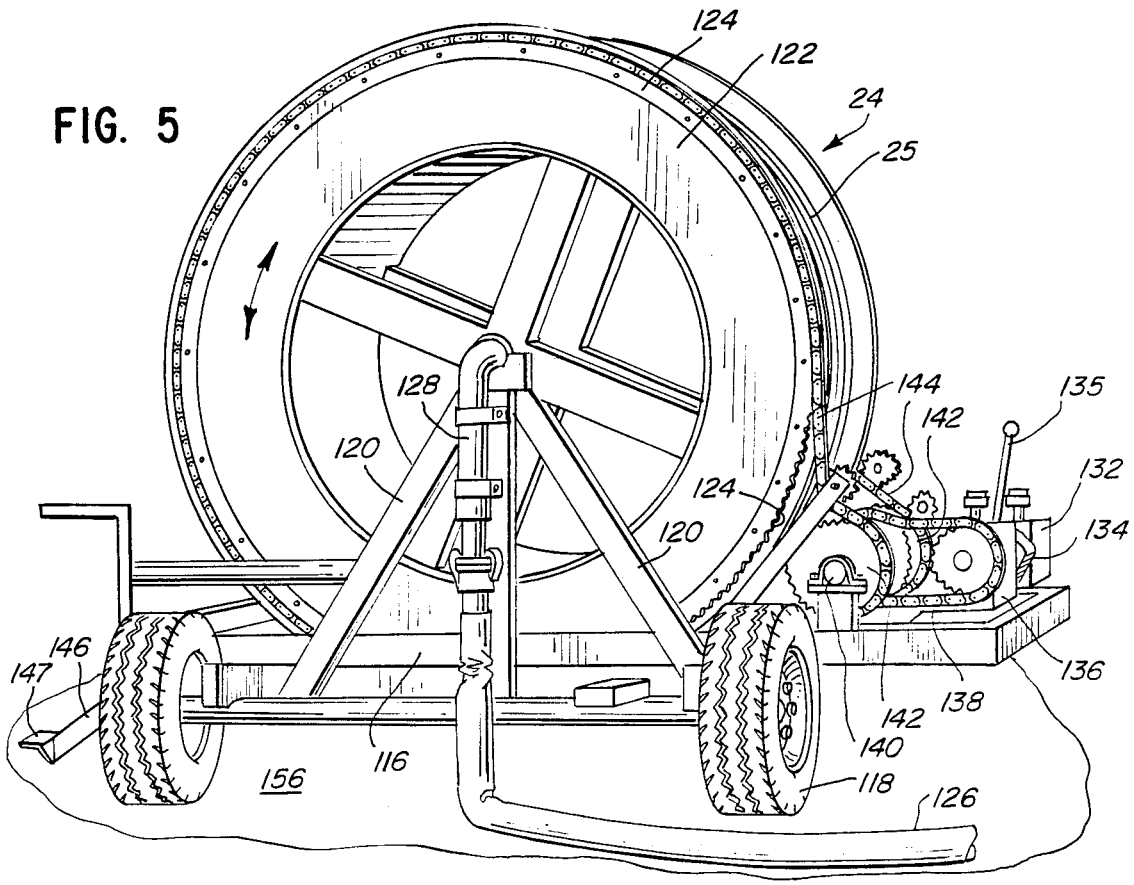

FIG. 3-A is a side view (with portions removed for better viewing) of the plow injector carriage showing certain elements in an elevated position;

FIG. 3-B is similar to FIG. 3-A, but depicts the elements in a lowered, ground-engaging position;

FIG. 4 depicts a rear view of a modified embodiment of the present invention; and FIG. 5 is a side view of the self-powered reel dolly of the present invention.

DESCRIPTION OF THE PREFERRED EMBODIMENT

Figure 1:
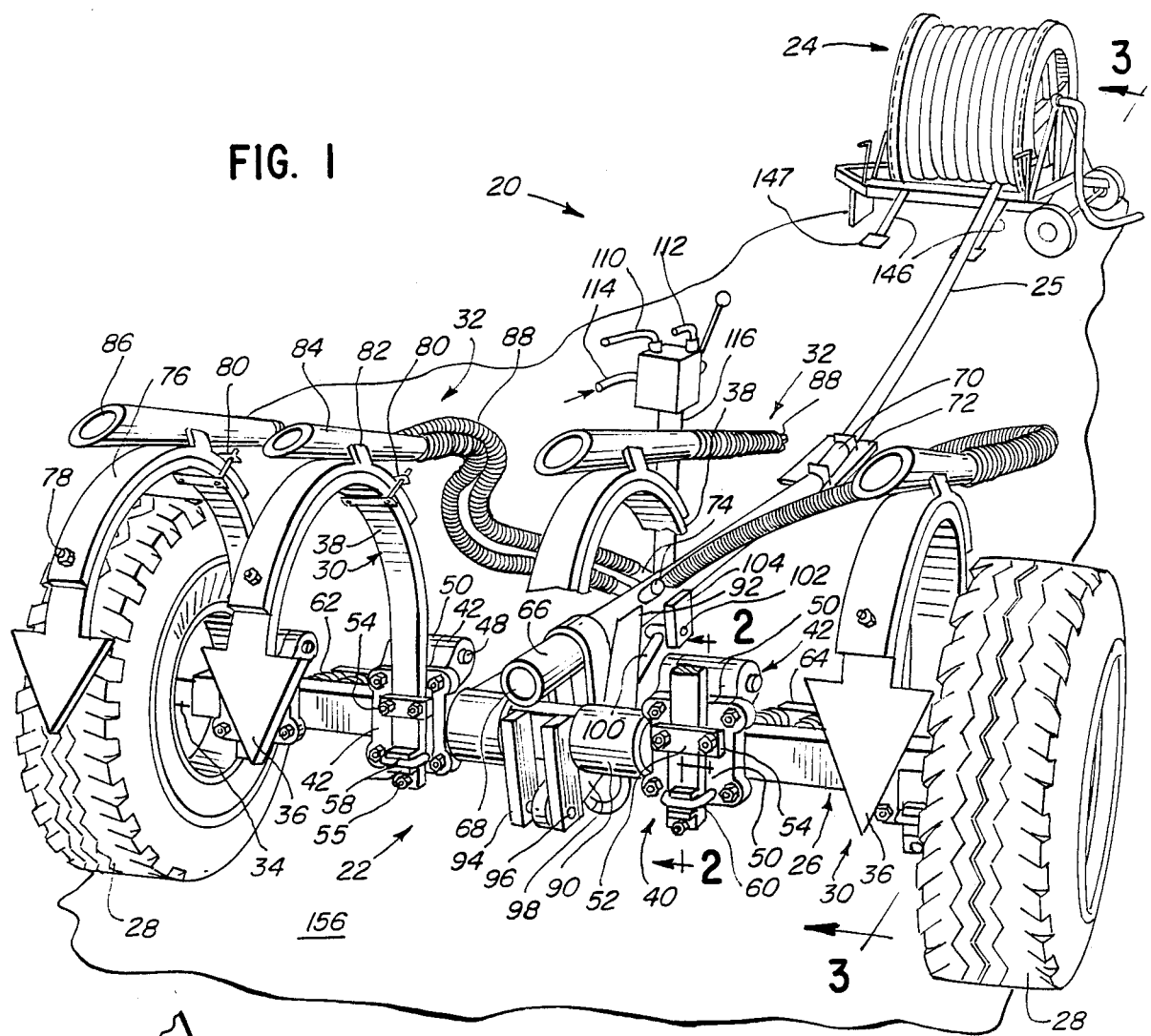
FIG. 1 is a rear perspective view of the plow injector carriage, supply line, and reel dolly of the present invention.

Having reference to the drawings, which illustrate the best mode presently contemplated as well as a modified embodiment for carrying out the invention, and wherein like reference numerals indicate corresponding elements, there is shown in FIG. 1 an illustration of the sub-surface sludge injector apparatus of the present invention, generally denoted by reference numeral 20. The sludge injector apparatus 20 includes a plow injector carriage assembly and a reel dolly assembly, respectively denoted by reference numerals 22, 24. The carriage 22 and dolly 24 are connected by a so-called "hard hose" traveling supply line 25. In the preferred embodiment, line 25 is made of a rugged polyethylene material, is approximately 6 inches in diameter, and is between 1,250 and 1,600 feet long.

The plow injector carriage 22 comprises an axle assembly 26, a pair of wheels 28, and a plurality (preferably four) of spring-biased plow share assemblies 30. An equal number of injector tube assemblies 32 are attached to the plow share assemblies 30.

Figure 2:
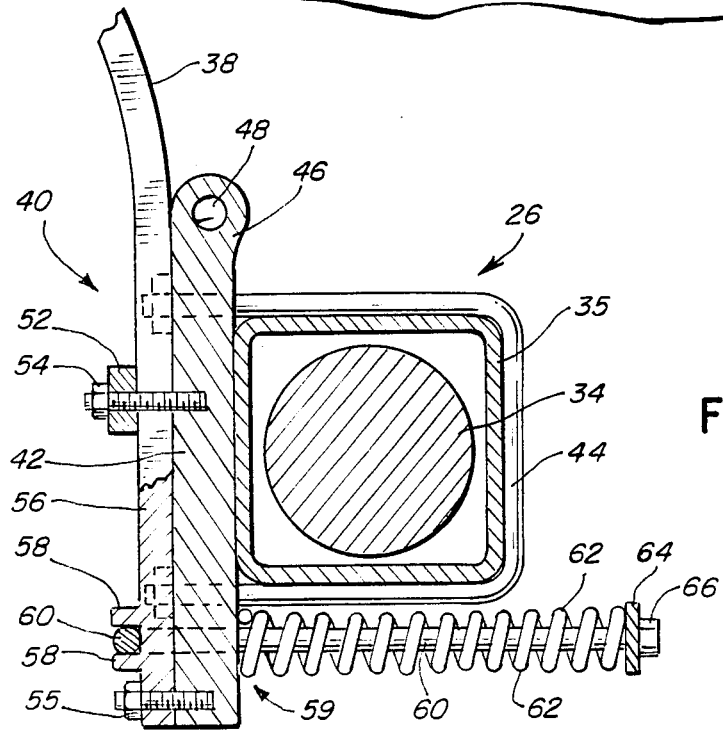
FIG. 2 is a section of the axle assembly for the plow carriage of this invention, taken along lines 2—2 of FIG. 1.

As best seen in FIG. 2, the axle assembly 26 comprises a round inner axle 34 which is connected to wheels 28 and is rotatably journalled within a square tube 35. The plow share assemblies 30 are rigidly mounted to square tube 35. More specifically, the assemblies 30 include so-called "scooter"-shaped plow blades 36 carried at the outer ends of curved plow shanks 38. Instead of scooter plow blades 36, so-called "chisel"-shaped plow blades could be utilized if desired, as is well known.

The plow shanks 38 are supported on the carriage 22 by plow support bracket assemblies 40. Each of the bracket assemblies 40 (see FIGS. 1 and 2) comprise a pair of mounting bracket plates 42 which are each rigidly secured to the square tube 35 by U-shaped fasteners 44. The mounting plates 42 each have an ear tab portion 46 at their upper ends which carries a pin 48. A central plow shank support plate 50 is pivotally connected via pin 48 to the ear tabs 46 of the plates 42. Through use of a crossbar 52 and threaded fasteners 54, 55, each central bracket 50 has the shank end 56 of the plow supports 38 rigidly fastened thereto.

The plow support units 40 also comprise spring-biasing units 59. These biasing units 59 include a pair of raised tabs 58 formed at the lower end 56 of shank 38 which are used to retain the central section of a U-shaped spring support hanger 60. Fitted upon each of the free ends of support hanger 60 are compression springs 62; they are maintained in place under a slight compression pre-load by a bar 64 and appropriate fasteners 66.

The plow injector carriage 22 has a primary manifold pipe 66 which has a cap 68 at its one end and a coupler 70 connected to the traveling supply line 25 at its other end. A ground-engaging skid 72 is securely affixed to the underneath side of coupler 70, such as by clamping skid 72 to pipe 66 and line 25. A plurality of stub discharge pipes 74 are so formed on pipe 66 as to extend upwardly and be canted slightly rearwardly (i.e., to the left in FIGS. 3-A and B) of 66.

Only one of the preferably four injector tube assemblies 32 will be discussed, since they are all similar. Each assembly 32 comprises a curved support bar 76 which is fastened by threaded fasteners 78 and clamp assemblies 80 to a curved plow support shank 38. Support tabs 82 formed on bar 76 are rigidly fastened, such as by welding, to an injector tube 84. The tube 84 has an effluent discharge end 86 which is angled (see FIGS. 3-A and B) and preferably slightly crimped, i.e., its diameter is slightly reduced at the very end. This crimping causes the effluent which flows through ends 86 to do so at a slightly increased speed and thereby keep the ends 86 free of dirt and debris. Preferably, the injector tubes 84 are approximately two inch diameter steel pipes; also the ends 86 are preferably slightly crimped. A flexible connector pipe 88 connects each of the injector tubes 84 to its respective stub discharge pipe 74 on supply manifold 66.

The manifold 66 is supported on the axle assembly 26 by a pair of support collars 90 through which the square axle tube 35 is fitted. Also, support struts 92 are rigidly fastened, such as by welding, at one end to the manifold 66 and at their other end to the support collars 90. A pair of hanger plates 94 are rigidly fastened, such as by welding, to one side of the square tube 35; at their opposite ends the plates 94 are pivotally connected by a pin 96 to one end of a hydraulic cylinder 98. The piston ram 100 of the cylinder 98 is pivotally connected at its outer end by a pin 102 to two downwardly depending struts 104; the struts 104 are securely affixed to the manifold 66. It will be seen that the square tube 35, as well as various plow injector members carried thereby, are operable to rotate relative to the manifold pipe 66, struts 92, and collars 90.

A hydraulic control box 106 is supported by an upstanding arm 116 carried by the manifold 66. The control box 106 has an operating lever 108, respective inlet and outlet hydraulic lines 110, 112, and a hydraulic line 114 connected to an external hydraulic power source (such as the hydraulic power system of a separate tractor, not shown).

The reel dolly assembly 24 comprises a frame 116 supported for movement upon wheels 118 and an upstanding reel cradle made up of support struts 120. A large diameter hose reel or drum 122 (preferably approximately 9 feet in diameter) is rotatably journalled upon the cradle members 120. The reel 122 is operable to freely play out and yet forcibly wind in, i.e., retrieve, the traveling hard hose supply line 25 as will be described. A large diameter chain sprocket 124 is formed on each side of the reel 122. A liquified waste supply line 126 is connected to the inflow connector pipe 128 of reel dolly 24 for supplying effluent to the traveling supply line 25.

A reel drive assembly 130 (see FIG. 5) comprises a motor 132, a clutch 134 with operating control lever 135, and a suitable speed reducer 136. The reducer 136 is connected by a drive chain 138 to a jack shaft 140 which is rotatably journalled on frame 116 and carries drive sprockets 142. A pair of main drive chains 144 drivably connect the large diameter reel chain sprockets 124 with the drive sprockets 142. Preferably, the motor 132 is a gasoline or diesel-powered engine.

The reel dolly assembly 24 can be firmly secured for operation at a desired stationary field location by lowering the support legs 146 which have ground-engaging footpads 147. Suitable well-known winding means (not shown) can be used to serially wind the supply line 25 back and forth across the face of reel 122 as the supply line 25 is drivably reeled in on reel 122. The effluent 158 can be pumped by an external pumping source (not shown) connected at the end of supply line 126 opposite where it is connected to the inflow connector pipe 128.

There is shown in FIG. 4 a modified embodiment of the plow carriage assembly generally denoted by reference numeral 22A. In addition to the spring-biased plow blade and injector tube components described above in connection with the preferred embodiment of plow carriage assembly, the carriage 22A includes a riser manifold tube 148 which is rigidly attached to and internally communicates with the primary manifold 66. This auxiliary manifold 148 carries at its upper end a so-called "water gun" 150 which is operable to selectively provide above ground spraying of effluent as desired.

Additionally, there is connected to the primary manifold 66 a laterally-extending spreader manifold 152 which is again rigidly affixed to and internally communicates with manifold 66. A suitable selector valve and handle 153 can be operated to switch the flow of effluent in manifold 66 to either the injector tube assemblies 32, the water gun 150, or the spreader manifold 152. If the spreader manifold 152 is used, effluent 158 can pour directly out of its open ends 154. Alternatively, flexible tubing (not shown but similar to flexible connector pipes 88) can be so attached to spreader manifold ends 154 as to hang close to the ground 156. In this manner, the effluent 158 can be more directly placed in a desired location along the ground 156, such as would be desirable for use in citrus groves, for example.

I turn now to a description of the operation of the sub-surface sludge injector apparatus of the present invention. The supply line 25 is disconnected from the coupler 70 of carriage 22 before the carriage 22 and dolly 24 are moved to a desired initial field location. The plow carriage 22 and reel dolly 24 can then be pulled or trailered to the desired field whereupon the footpads 147 of assembly 24 are lowered so as to firmly engage the ground 156 (see FIGS. 1 and 5). At this time, the plow share assemblies 30 and injector tube assemblies 32 of carriage 22 are in their raised or uppermost positions (see FIGS. 1, 3-A, and 4.) The supply line 25 is reconnected to coupler 70 of carriage 22. Then, through external means, such as a tractor (not shown) having a suitable hydraulic power source, the plow carriage assembly 22 is pulled out into the field to its extended position. This operation acts to freely unwind the supply line 25 from the reel 122 until the full length of line 25 has been played out.

After connecting the hydraulic line 114 to the tractor's external hydraulic source (not shown), the operating lever 108 is activated. This causes hydraulic fluid to force piston ram 100 to move from its extended position (see FIG. 3-A), to its fully withdrawn position (see FIG. 3-B). Since manifold 66 is unable to move, i.e., rotate, this action causes the plates 94, as well as the square tube 35 and other plow and injector members attached thereto, to be rotated in a counterclockwise direction (compare FIG. 3-A to FIG. 3-B). This counterclockwise rotation of square tube 35, in turn, causes the respective plow share assemblies 30 and injector tube assemblies 32 to be similarly rotated from their uppermost positions (FIG. 3-A) to their lowered or ground-engaging positions (FIG. 3-B).

Initially, the plow blades 36 will only be partially embedded into the ground 156. Further, continued operation of lever 108 will likely result in having engagement of plows 36 with ground 156 effect a temporary lifting of wheels 28 and carriage assembly 22 off the ground 156. This temporary elevation of carriage 22 will cease at such time as the plows 36 further engage, i.e., dig in, the ground to their full depth (see FIG. 3-B) whereby the wheels 28 will again engage the ground 156. This latter action, of course, will occur once the plow carriage assembly 22 is pulled towards the reel dolly 24. In the preferred embodiment, the plow share assemblies 30 are operable to penetrate into the ground 156 approximately 12–14 inches, such that effluent 158 is applied at approximately that distance below the ground's surface. Also, the tires 28 are preferably filled with a suitable amount of water to further stabilize the travel of the plow injector carriage 22 and maintain it in a ground-engaging position during its entire sludge injecting operation.

Once the plows 36 have been initially engaged to the ground 156, the hydraulic line 114 is disengaged from the external hydraulic power source, and the operator then returns to the stationary reel dolly assembly 24.

Through operation of the motor 132 and control lever 135, the reel drive assembly 130 is placed in its driving mode thereby causing the reel 122 to rotate in a counterclockwise direction (see arrow in FIG. 3-B). This powered rotation of reel 122 acts to wind in supply line 25 whereby the plow injector carriage 22 is moved, i.e., it plows through the ground and injects effluent, from its initial downfield position to a "home" position adjacent the reel dolly 24. Shut-off means (not shown) automatically disengage the clutch and cause the plow carriage assembly 22 to stop at the "home" position.

The spring-biasing units 59 normally operate to forcibly maintain the plow blades 36 into the ground 156. However, when a particular blade 36 engages an obstacle in the ground 156, the blade 36 is operable, due to the spring-biasing action of the biasing units 59, to be temporarily elevated until the obstruction has been cleared. Thereafter, the normal biasing action of the biasing units 59 urges the plow blades 36 back down into their lowered positions (FIG. 3-B). When an obstruction is so encountered and the biasing units 59 are biased from their normal positions, the combination of the crossbar 52, plow support arms 38, and central support bracket 50 of a plow support unit 40 rotate about pin 48, whereby the U-shaped spring support rod 60 causes the springs 32 to be further compressed.

During the plowing and injecting movement of carriage 22, there are inherent downwardly-directed forces placed upon the coupler 70 of manifold pipe 66. These are due to the pulling forces of supply line 25 coupled with the forces placed on carriage 22 and pipe 66 by the plow blades 36 as they are pulled through the ground 156. However, skid 72 operates to prevent coupler 70 from being forced into the ground by such forces. Thus, the carriage 22 is stabilized in an appropriate ground-engaging position for providing subsurface sludge injection as it is moved towards the reel dolly 24. This is due to the combination of the wheels 28, the skidplate 72, and the multiple plow blades 36, all of which engage the ground.

During operation of carriage 22, as shown in FIG. 3-B, the plow share assemblies 30 dig furrows, generally denoted by numeral 160, into the ground 156. The liquified effluent 158 from supply line 25 and manifold 66 flows through each stub discharge pipe 74, flexible connector pipe 88, injector tube 84 and then into the furrow 160. The displaced earth 162 generally falls back into the furrows 160 after the plow carriage assembly 22 has passed. Additional means (not shown) carried on the rear of carriage 22, such as diagonal scraper boards or a plurality of sets of angled wiper follower wheels (i.e., with one set of angled wiper wheels per blade 36), for example, could be used to scrape or direct the displaced earth 162 back into the furrow 160 so as to cover up the discharged effluent 158 laying in the bottom furrow 160.

It is thus seen that the injector apparatus 20 of the present invention acts as a traveling effluent injector. That is, it is a relatively inexpensive device for the subsurface application of liquified waste effluent. This can be accomplished without continuous operation by a manual operator (other than for initial set-up or periodic relocation to provide successive applications along a field). Also, the apparatus utilizes the external hydraulic power source of readily-available farm equipment as needed. Moreover, the plow carriage assembly 22 is powered, i.e., moved along the ground, by the action of the traveling hard hose supply line 25 as the latter is reeled in by the reel dolly assembly 24. Thus, no power source is required for the plow injector carriage 22. This is contrary to prior art sludge injector units such as those carried on the rear of tractor devices or large trucks. Also, as the carriage assembly 22 is relatively light in weight compared to such prior art injector devices, its wheels 28 do not unduly and undesirably compact the ground as the carriage 22 travels across a field.

The preferred embodiment of the present invention can provide sub-surface injection of sludge or other waste materials at the rate of approximately 400 gallons per minute (when using the preferred four-injector tube version). Further, the plow carriage assembly 22 can be retrieved back to the reel dolly assembly 24 at speeds up to approximately 45 feet per minute.

When the modified embodiment of FIG. 4 is utilized, the plow share assemblies 30 and injector tube assemblies 32 are left in their elevated storage positions (see FIG. 1). Then, while the carriage 22-A is being reeled "home" by the reel dolly 24, either the water gun 150 or the spreader manifold 152 can be selectively utilized. The carriage 22-A of FIG. 4 is particularly advantageous for multiple-use sludge application requirements. That is, it is useful where on one day a particular liquified effluent is to be applied underground by the plow share assemblies 30 and injector tube assemblies 32, whereas on other days a different type of liquified effluent might be applied above ground by the water gun 150 or the spreader manifold 152. Thus, by using modified carriage 22-A, an operator need not utilize different plow carriage assemblies 22 or separate water guns. Also, through use of the spreader manifold 152, a more concentrated form of effluent slurry can be disbursed than with the water gun 150.

From the foregoing, it is believed that those skilled in the art will readily appreciate the unique features and advantages of the present invention over previous types of sub-surface effluent injection apparatus. Further, it is to be understood that while the present invention has been described in relation to a particular preferred embodiment and an alternate embodiment as set forth in the accompanying drawings and as above described, the same nevertheless is susceptible to change, variation and substitution of equivalents without departure from the spirit and scope of this invention. It is therefore intended that the present invention be unrestricted by the foregoing description and drawings, except as may appear in the following appended claims.

I claim:

1. A sub-surface liquified waste injector apparatus comprising:

a supply of liquified waste;

reel dolly means having a reel means mounted for rotation upon a wheeled frame means, and power drive means operable to drivably rotate said reel means;

plow injector carriage means including frame means carried by wheel means, a plurality of ground-engageable plow blade means and injector tube means mounted on said frame means, and liquified waste manifold means connected to said injector tube means; and traveling supply hose means connecting said waste manifold means to said reel dolly means and to said supply of liquified waste, said supply hose means operable to supply liquified waste to said waste manifold means from said waste supply and to drivably propel said carriage along the ground as said supply hose means is reeled in by said reel dolly, whereby movement of said plow injector carriage means towards said reel dolly means causes said plow blade means to plow furrows in the ground into which said injector tube means disperses liquified waste.

2. The invention of claim 1 and wherein said power drive means includes motor means and chain drive means for rotatably driving said reel means to thereby reel in said supply hose means.

3. The invention of claim 1 and including ground-engaging skid plate means mounted proximate said manifold means, wherein said skid plate means cooperates with said carriage wheel means and said ground-engageable plow blade means to provide stabilization of said plow injector carriage means as the latter is drivably pulled toward said reel dolly means by said supply hose means.

4. The invention of claim 1, and including power control means carried on said plow injector carriage, said power control means operable, when connected to a separate power source, to selectively move said plurality of plow blade means and said plurality of injector tube means between elevated storage positions and lowered ground-engaging positions relative to said carriage frame means and said manifold means.

5. The invention of claim 4, and including flexible connector pipe means connecting said manifold means to said injector tube means for providing a continous connection therebetween regardless of the position of said injector tube means.

6. The invention of claim 1, wherein said plurality of plow blade means are yieldably mounted on said carriage frame means by spring biasing means, said spring biasing means being operable, when said plow blade means are in a ground-engaging position, to maintain said plow blade means engaged in the ground while allowing temporary elevated biasing of a particular said plow blade means as needed whenever such a plow blade means encounters an obstacle in the ground.

7. The invention of claim 1, wherein each said injector tube means comprises a metallic tube having its injecting end slightly crimped to a dimension slightly less than the remainder of said tube.

8. The invention of claim 4 including axle tube means rotatably mounted on said plow injector carriage, said plow blade means and injector tube means being supported by said rotatable axle tube means, and wherein said power control means comprises a control lever means and a hydraulic cylinder means mounted to said carriage frame means and operable, when connected to a separate power source, to selectively rotate said rotatable axle means between desired operating positions.

9. The invention of claim 1, and including additional manifold means for selectively providing above-ground dispersion of liquified waste.

* * * * *